United States Patent [19]

Foggini

[11] Patent Number: 4,770,057
[45] Date of Patent: Sep. 13, 1988

[54] LEVER ELEMENT, PARTICULARLY PARKING BRAKE CONTROL LEVER FOR MOTOR VEHICLES

[75] Inventor: Paolo Foggini, Revigliasco, Italy

[73] Assignee: Foggini Progetti SRL, Beinasco, Italy

[21] Appl. No.: 64,488

[22] Filed: Jun. 22, 1987

[30] Foreign Application Priority Data

Jul. 1, 1986 [IT] Italy ................. 53585 B/86

[51] Int. Cl.⁴ ................. G05G 1/04; G05G 5/06
[52] U.S. Cl. ................. 74/523; 74/99 A; 74/527; 74/523; 74/530; 74/543; 192/93 A
[58] Field of Search ............... 74/523, 530, 523, 527, 74/503, 99 A, 548, 540, 543, 473 R, 143, 480, 501 R, 501 A, 501.5 R, 475; 192/93 A, 67 R

[56] References Cited

U.S. PATENT DOCUMENTS

| | | | |
|---|---|---|---|
| 3,525,272 | 8/1970 | Olson | 74/530 |
| 3,701,333 | 10/1972 | Schwerdhoefer | 74/523 |
| 3,827,313 | 8/1974 | Kiessling | 74/529 |
| 3,941,008 | 3/1976 | Cambria | 74/143 |
| 4,289,309 | 9/1981 | Hoffmann | 74/529 |
| 4,507,601 | 3/1985 | Andresen | 74/523 |
| 4,515,033 | 5/1985 | Carlo | 74/473 R |
| 4,541,298 | 9/1985 | Strutt | 74/530 |
| 4,565,151 | 1/1986 | Buma | 74/475 |

FOREIGN PATENT DOCUMENTS

| | | | |
|---|---|---|---|
| 3143951 | 5/1983 | Fed. Rep. of Germany | 74/523 |
| 3410938 | 10/1984 | Fed. Rep. of Germany | 74/473 R |
| 374603 | 6/1932 | United Kingdom | 74/473 R |

Primary Examiner—Gary L. Smith
Assistant Examiner—Vinh Luong
Attorney, Agent, or Firm—Guido Modiano; Albert Josif

[57] ABSTRACT

This lever element comprises a hollow lever body of polymeric material ending at one end with a handgrip, and at another end with an upturned U-shaped end portion surounding and partially containing a rigid support of polymeric material, having a circular portion with a first front teeth formation. The upturned U-shaped end portion of the lever is rotively rigid with a disc having a second front teeth formation facing the first teeth formation of the support for retaining the lever; elastic means being provided for pushing the disc into frontal contact engagement with the support, and mutually engaging the first and second front teeth formations. Furthermore release means, controlled by a pushbutton on the lever, are interposed between the support and the disc for controlled release of their frontal contact engagement.

7 Claims, 2 Drawing Sheets

U.S. Patent  Sep. 13, 1988  Sheet 2 of 2  4,770,057
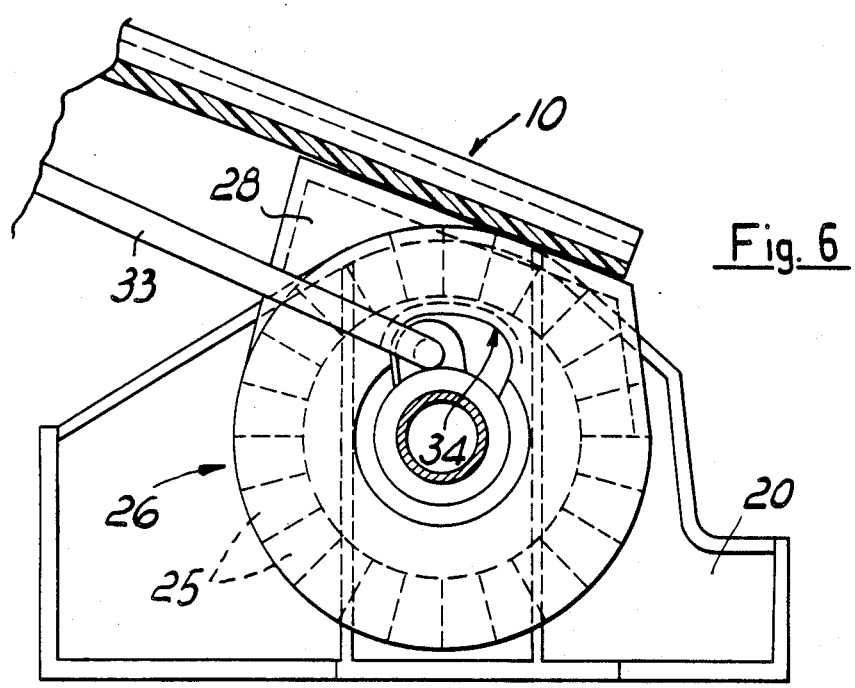
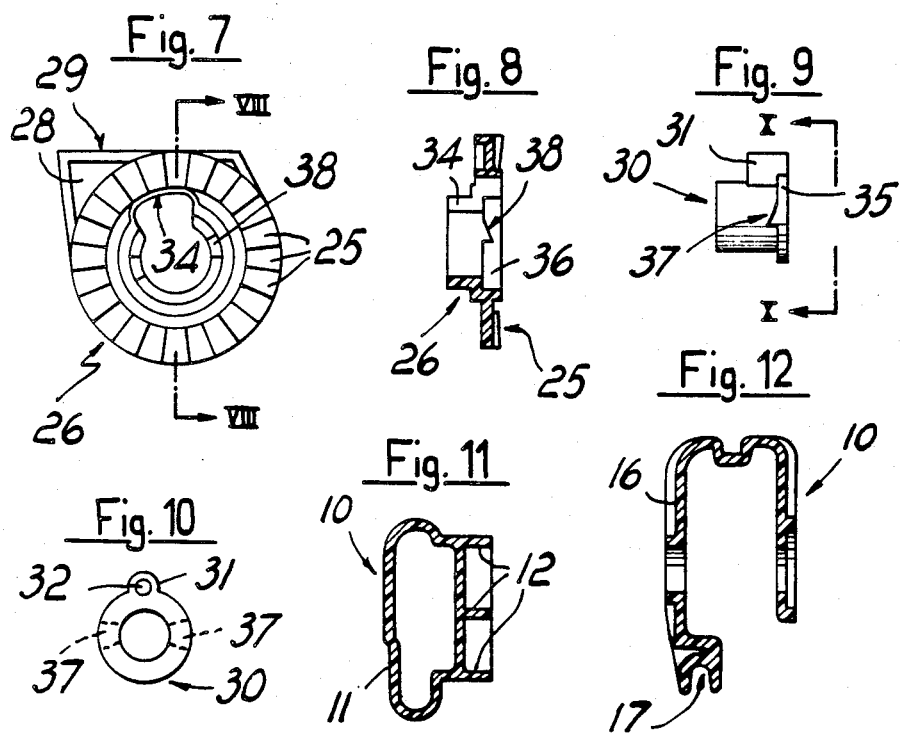

LEVER ELEMENT, PARTICULARLY PARKING BRAKE CONTROL LEVER FOR MOTOR VEHICLES

BACKGROUND OF THE INVENTION

The present invention relates to a lever element, particularly a parking brake control lever for motor vehicles.

As is known, levers for the use specified are currently provided in sturdy printed sheet metal, generally with U-shaped cross section, and include a retention device with a tooth, spring biased to engage a notched sector, disengageable by means of a kinematism comprising a pushbutton arranged at the end of the lever handgrip. Currently, in motor vehicles, for cost related, weight related, functional and aesthetic reasons, there is a trend towards the replacement of most of the on board equipment and fittings traditionally made of metal with similar equipment and fittings made of plastic material.

Within the scope of this technological updating, some traditionally metallic elements can be made of plastic material without particular difficulty, others instead pose remarkable production problems which are not easy to solve.

In the case of the parking brake control lever, it is obvious that the structure of the conventional metallic levers cannot be reproduced in plastic material, since, due to the significant difference of the mechanical resistance of steel with respect to that of all polymeric materials, the lever, for obtaining equal resistance and safety, would assume unacceptable overall dimensions.

SUMMARY OF THE INVENTION

The aim of the present invention is to solve this problem by providing a control lever as specified, structured so as to allow its production with polymeric material without dimensions, resistance, lifespan and reliability being negatively affected.

Another object of the present invention is to provide a lever improved both from the point of view of effectiveness and that of comfort in use, the maneuver of the lever according to the present invention being—as will become apparent hereinafter—gentler and more adjustable.

In order to achieve these objects and others which will become apparent from the detailed description which follows, the present invention relates to a lever element, particularly parking brake control lever for motor vehicles, characterized in that it comprises a hollow lever body of polymeric material with tubular cross section ending at one end with a handgrip, and at another end with an upturned U-shaped end portion surrounding and partially containing a rigid support of polymeric material, having a circular portion with a first front teeth formation; said upturned U-shaped end portion of the lever being rotatively rigid with a disc having a second front teeth formation facing said first teeth formation of said support for retaining the lever; elastic means being provided for pushing said disc into frontal contact engagement with said support and mutually engaging said first and second front teeth formations, and release means, controlled by a pushbutton on said lever, being interposed between said support and said disc for controlled release of said frontal contact engagement.

BRIEF DESCRIPTION OF THE DRAWINGS

The invention will be understood from the following detailed description and with reference to the accompanying drawings, wherein:

FIG. 6 is a cross section view taken along the line VI—VI of FIG. 2;

FIG. 7 is a front view, from the side of the teeth, of the disc rigidly associated with the lever, FIG. 8 is a cross section view taken along the line VIII—VIII of FIG. 7;

FIG. 9 is an elevation view of a detail of the releasing means;

FIG. 10 is a plan view along the arrows X—X of FIG. 9;

FIGS. 11 and 12 are cross section views of the body of the lever taken respectively along the lines XI—XI and XII—XII of FIG. 1.

DESCRIPTION OF THE PREFERRED EMBODIMENTS

Figure 1:
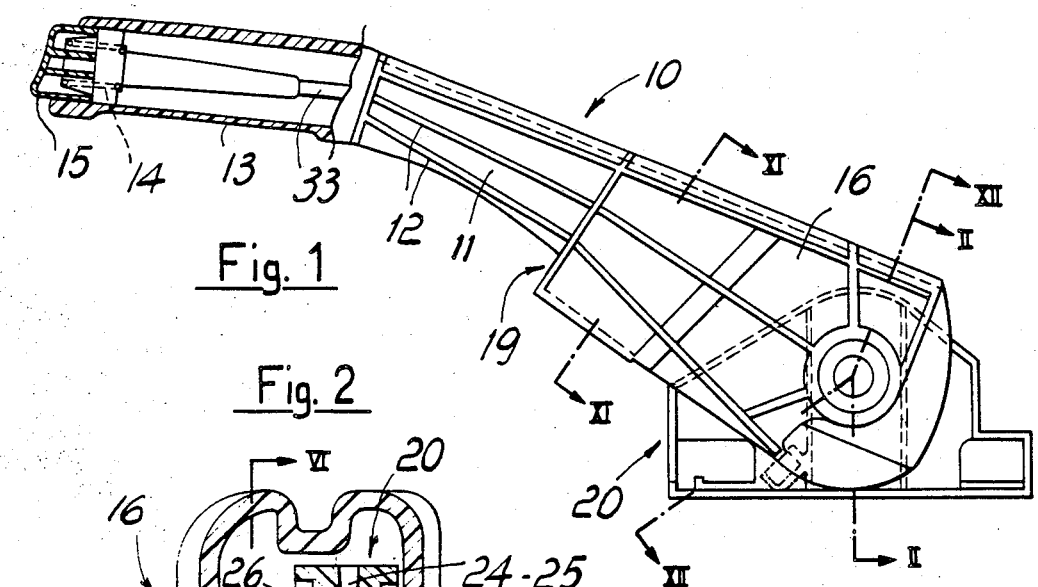
FIG. 1 is a front elevation view, in partial cross section, of the lever according to the invention.

In the drawings, the reference numeral 10 indicates the lever body and 20 indicates the rigid support whereto said body is articulated by means of a strong riveted tubular pivot P.

The body 10 of the lever is of polymeric material, advantageously thermoplastic injection-printable, and comprises a central part 11 with tubular profile stiffened by external ridges 12 and ending with an end handgrip 13. In the handgrip is mounted, slideable against the action of a spring 14, a pushbutton 15 which will be described in detail hereinafter.

At the other end, the body 10 of the lever ends in a portion 16 profiled in the shape of an upturned U, suitable to embrace and partially contain the support 20. A wall of the portion 16 is profiled, in its lower part, in the shape of an arc of a circle and is provided with a throat 17 intended to receive the brake operating cable 18, the end whereof (not illustrated) is fixed at 19 on the central part 11 of the lever.

Figure 2:
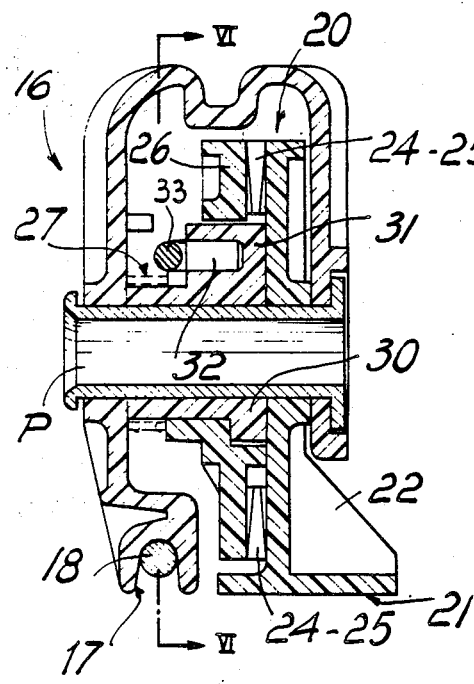
FIG. 2 is a cross section, in enlarged scale, taken along the line II—II of FIG. 1.
Figure 3:
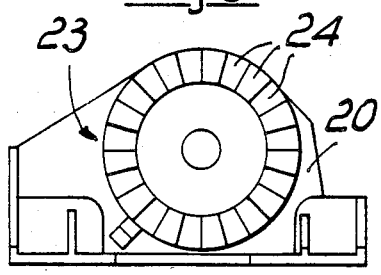
FIG. 3 is a front elevation view only of the support of the lever.
Figure 4:
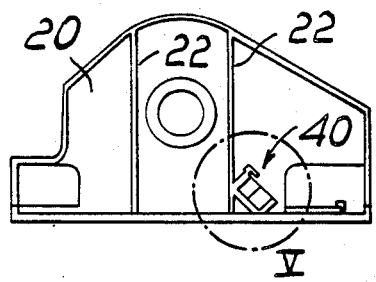
FIG. 4 is a view of the support rotated through 180° with respect to FIG. 3.

As is clearly illustrated in FIG. 2, the support 20 is formed by a single rigid wall of polymeric material provided with a widened base 21 and stiffened by external ridges 22. On its inner side, the support 20 is provided with a circular portion 23 (FIG. 3) on which a front circular-crown teeth formation 24 is provided; said teeth formation being of the type with saw-teeth; each tooth being formed by an inclined plane truncated by a radial plane. The teeth formation 24 of the support engages with a corresponding teeth formation 25 of a disc 26, mounted freely rotatable about the axis of the pivot P, on a sleeve 30 which will be described hereinafter and pushed into frontal contact engagement with the support 20 by a spring 27 reacting on the inner face of the lateral wall of the lever. Thus the support 20 and the disc 26 form together a free-wheel system.

As FIGS. 6 and 7 illustrate, the disc 26 is provided with a lug or protruding portion 28 defining a resting plane 29 for the lever 10; the plane 29 being in contact with the inner upper surface of the lever so that the rotation thereof around the pivot P causes a corresponding rotation of the disc 26.

The teeth of the support 20 and of the disc 26 have their inclined planes mutually facing and, in the rest position, held in direct contact by the spring 27, rotation of the disc 26 being allowed clockwise (with respect to FIGS. 1 and 6) upon actuation of lever 10 by the elastic yielding of the spring 27, produced by relative sliding of the inclined planes of the teeth.

The relative sliding of the inclined planes of the teeth in fact causes axial shift of the disc 26 in the direction away from the support 20, made possible by the simple contact between the plane 29 and the lever 10.

On the other hand, the opposite rotation is prevented by the mutual locking engagement between the truncation planes of the teeth and this causes the required retention of the lever. A control means is interposed between the support 20 and the disc 26 and is controlled by the pushbutton 15, to release, by pressing of said pushbutton, said locking engagement between the teeth formations of the support and of the disc. Said means comprises the sleeve 30 which is mounted freely rotatable on the pivot P and is provided with an eccentric tab 31 provided with a hole 32 for engaging the end of a control rod 33 having the other end rigidly associated with the pushbutton 15. A cut-out portion 34 (FIG. 7) is provided in the disc 26 to allow a corresponding angular oscillation of the sleeve 30, imparted by the control rod 33. The sleeve 30 is furthermore provided with a collar 35 intended to be accommodated into a corresponding widened seat 36 of the disc 26. On the collar 35, at least two diametrally opposite teeth 37 are formed, also with a saw-tooth profile with conjugated inclined planes and radial truncation.

Two teeth 38 countershaped to the teeth 37 are correspondingly formed in the seat 36. The inclined planes of the teeth are orientated so as to mutually engage when the sleeve 30 is made to oscillate angularly by the pressure exerted on the pushbutton 15 and therefore clockwise with reference to FIG. 6. This causes a corresponding axial disengagement shift of the disc 26 which moves against the action of the spring 27 (to the left with respect to FIG. 2) releasing the front coupling with the teeth formation 24 of the support 20. To facilitate this axial motion of the disc 26 and thus soften the operation of the pushbutton 15, it is advantageous for the truncation planes of the front teeth formations 24 and 25 to be slightly inclined rather than radial; this inclination being in any case selected smaller than the angle of friction between the teeth.

Figure 5:
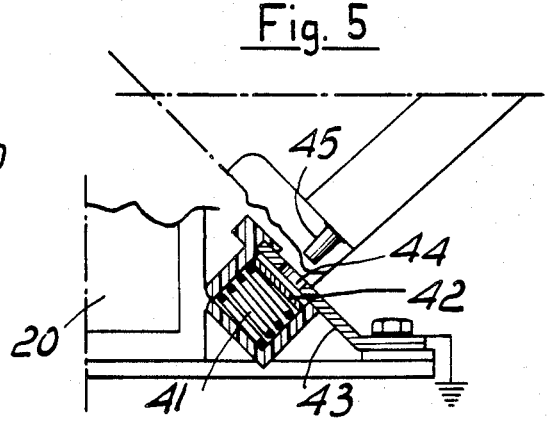
FIG. 5 is a detail, in enlarged scale, of FIG. 3.

As illustrated in FIG. 5, the support 20 furthermore comprises, on its outer side, a switch seat 40 containing, slideable against the action of a spring 41, a movable electric contact 42 suitable to engage a corresponding fixed contact 43; the contacts 42 and 43 being inserted in the circuit of an optical and/or acoustic warning device.

On the fixed contact 43, a window 44 is formed crossed by a lug 45 carried by the end portion 16 of the lever 10 and suitable to produce the uncoupling of the movable contact 42 from the fixed one 43 when the lever is in the lowered end-of-stroke position.

The invention is susceptible to numerous modifications and variations within the inventive scope. Furthermore the details may be replaced with other technically equivalent ones.

I claim:

1. Lever element, particularly parking brake control lever for motor vehicles, comprising a hollow lever body of polymeric material with tubular cross section ending at one end with a handgrip, and at another end with an upturned U-shaped end portion surrounding and partially containing a rigid support of polymeric material, having a circular portion with a first front teeth formation; said upturned U-shaped end portion of the lever being rotatively rigid with a disc having a second front teeth formation facing said first teeth formation of said support for retaining the lever; elastic means being provided for pushing said disc into frontal contact engagement with said support, and mutually engaging said first and second front teeth formations, and release means, controlled by a pushbutton on said lever, being interposed between said support and said disc for controlled release of said frontal contact engagement.

2. Lever according to claim 1, wherein said disc comprises a protruding portion defining a resting plane for the lever; said plane being slideable with respect to the lever to allow corresponding axial movements of said disc.

3. Lever according to claim 1, wherein said hollow lever body and said support are articulated through a pivot carrying a freely rotatable and slideable sleeve which in turn supports, freely rotatable, said disc; and wherein said sleeve bears an eccentric tab having a hole for accommodating and end of a control rod and has a widened collar accommodated in a corresponding widened seat of said disc; said collar and said widened seat having each a pair of mutually conjugated teeth, with inclined-plane profiled, thereby causing an axial shift movement of said disc with respect to said sleeve and said support and disengagement of said teeth formations, when said sleeve is rotated by said control rod.

4. Lever according to claim 3, wherein said control rod has another end thereof engaged with a control pushbutton freely slideable, against a spring, at an end of a lever handgrip.

5. Lever according to claim 1, wherein said support comprises a single rigid wall having a widened base and external stiffening ridges.

6. Lever according to claim 1, wherein said support, on an outer face thereof, has a seat accommodating a movable switch contact, engageable by a lug of said lever, when said lever is in lowered position, and movable away from a fixed contact; said fixed and movable contacts being circuitally connected to an optical and/or acoustic warning device.

7. Lever according to claim 1, wherein said upturned U-shaped end portion comprises a wall shaped as an arc of a circle and defining a throat accommodating a brake operating member having an end portion fixed at a middle portion of said lever body.

* * * * *